United States Patent [19]

Keller et al.

[11] 4,392,230

[45] Jul. 5, 1983

[54] METHOD AND APPARATUS FOR THE MANUFACTURE OF SILICON BY CRUCIBLE-FREE ZONE MELTING

[75] Inventors: Wolfgang Keller, Munich; Hans-Christian Grassmann, Igelsdorf; Karl Schmidt, Erlangen, all of Fed. Rep. of Germany

[73] Assignee: Siemens Aktiengesellschaft, Berlin & Munich, Fed. Rep. of Germany

[21] Appl. No.: 185,752

[22] Filed: Sep. 10, 1980

[30] Foreign Application Priority Data

Sep. 21, 1979 [DE] Fed. Rep. of Germany ....... 2938348

[51] Int. Cl.[3] .............................................. B01J 7/10

[52] U.S. Cl. .................................................. 373/139

[58] Field of Search ....................... 13/DIG. 1, 26, 27; 373/139, 147, 148

[56] References Cited

U.S. PATENT DOCUMENTS 3,270,177 8/1966 Prediger et al. ................ 13/DIG. 1

3,985,947 10/1976 Keller .

FOREIGN PATENT DOCUMENTS 2739060 8/1977 Fed. Rep. of Germany .

*Primary Examiner*—Roy N. Envall, Jr.

*Attorney, Agent, or Firm*—Herbert L. Lerner; Laurence A. Greenberg

[57] ABSTRACT

Method of producing silicon by crucible-free zone melting a substantially vertically held silicon rod with which a melting zone, produced by an induction heating coil which, together with an oscillating-circuit coil connected in series therewith and determining the oscillating-circuit frequency and having a high inductance in comparison with that of the induction heating coil heating up the rod material, forms the inductive component of a heating parallel oscillating circuit fed by a high-frequency generator and has a heating circuit capacitor connected in parallel with the heating coil, is passed through the silicon rod in direction of the rod axis, which comprises dimensioning the component resonance circuit formed by the induction heating coil and the heating-circuit capacitor to a frequency deviating by less than a factor of 2 from the frequency of the high-frequency generator.

7 Claims, 2 Drawing Figures

Figure 1:
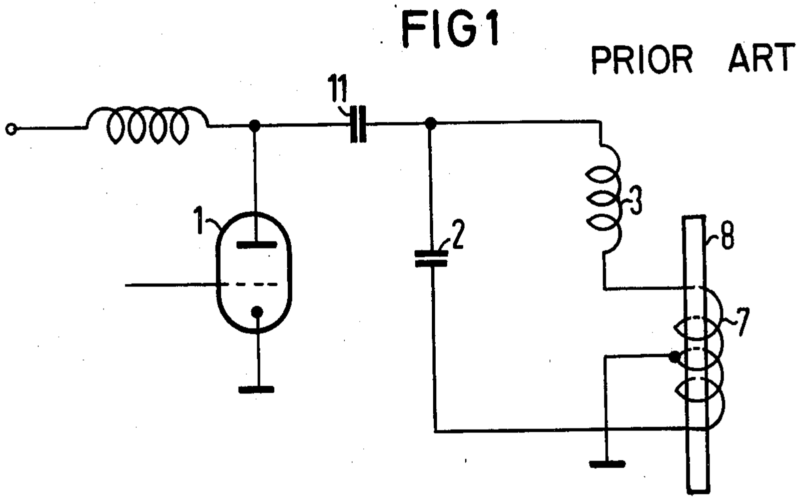
FIG 1 PRIOR ART

METHOD AND APPARATUS FOR THE MANUFACTURE OF SILICON BY CRUCIBLE-FREE ZONE MELTING

The invention of the instant application relates to a method and apparatus for producing silicon by crucible-free zone melting a vertically held silicon rod with which a melting zone, produced by an induction heating coil which, together with an oscillating or tank-circuit coil connected in series therewith and determining the oscillating or tank-circuit frequency, and having a high coil heating up the rod material, forms the inductive component of a heating parallel oscillating circuit fed by a high-frequency generator and has a heating-circuit capacitor connected in parallel therewith, is passed through the silicon rod in direction of the rod axis.

In the manufacture of silicon by crucible-free floating-zone melting, a silicon rod is clamped vertically in an evacuated or protective gas-filled receptacle and heated inductively by means of a coil annularly surrounding the rod. The thus produced melting zone is slowly passed in a direction through the rod.

A zone-melting process can become known heretofore from German Published Prosecuted Application (DE-AS) No. 24 25 468, corresponding substantially to U.S. Pat. No. 3,985,947, wherein an induction heating coil annularly surrounding, with clearance, a semiconductor rod, is supplemented by a capacitance connected in parallel therewith to form an electrical heating oscillating circuit, and wherein this heating oscillating circuit is subjected to a high-frequency generator delivering thereto an alternating current with adjustable frequency through a coaxial cable and at least one adjustable coupling element. In this heretofore-known process, the output of a high-frequency generator is formed as an oscillating circuit with variable adjustment of the output frequency. The output frequency is adjusted through a capacitor of the output oscillating circuit having an adjustable capacitance. Coupling thereto of the heating oscillating circuit formed of the induction heating coil and a capacitor connected in parallel with the latter is effected through a high-frequency line, a capacitive coupling element and through a decoupling coil which, for its part, forms, with the induction coil of the output oscillating circuit of the high-frequency generator, a transformer with variable degree of coupling.

At the start of the crucible-free zone-melting process, the melting zone is generally produced initially at the boundary between a monocrystalline seed and the silicon rod to be transformed into a monocrystal. Usually, the diameter of the seed crystal is many times smaller than that of the rod to be melted. A gradual transition of the diameter of the melting zone from that of the seed crystal to that of the rod to be melted is therefor provided for. Since the diameter of the induction heating coil remains unchanged, a marked variation of the mutual inductance of the induction-heating coil and the silicon rod occurs during the shifting of the melting zone from the boundary to the seed crystal into the silicon rod to be melted. The mutual inductance and the coupling of the silicon rod to the induction heating coil increases with increasing diameter of the rod. This results, generally, in considerable variations of the current produced in the melting zone.

To counter this, provision can be made for ensuring that an optimal operating point of the heating oscillating circuit exists at all times during the process through continuous adjustment of the decoupling of the heating oscillating circuit by means of a band-filter circuit such as has become known heretofore from the aforementioned German published prosecuted application or the U.S. patent corresponding thereto. Such an adjustment is difficult to effect, however, due to the supercritical coupling, especially for large load variations as occur during crucible-free zone melting of semiconductor rods with diameters greater than 50 mm. Dispensing with the adjustment of the coupling requires, on the other hand, a great expense with respect to the cooling of the individual circuit components, especially the connecting cable between the high-frequency generator and the heating oscillating circuit.

These heretofore known band-filter circuits, which have a good efficiency and deliver a sinusoidal high frequency, have a further disadvantage in that the employed mechanical power regulation over the frequency is very sluggish and can result in detrimental temperature deviations in the monocrystal.

For example, it has become known heretofore from German Published Non-Prosecuted Application (DE-OS) No. 27 39 060 to connect the heating parallel resonance circuit of zone melting apparatus through a coupling capacitor directly to the anode of the oscillator tubes and to construct that circuit, because of the low inductance of the customarily used induction heating coil, so that the induction heating coil is serially connected to an oscillating circuit coil which, for electrical reasons, has a high inductance when compared to that of the induction heating coil. Apparatus operating with such a circuit have a disadvantage, however, in that the voltage applied to the induction heating coil is rich in harmonics and, therefore, when compared with a harmonics-poor oscillating circuit, requires a greater voltage at the induction heating coil for the same heating power. Danger increases therewith, however, of the occurrence of flash-overs in vicinity of the induction heating coil which can result in damage to the zone-melting apparatus. In addition, such a circuit has a relatively poor efficiency.

A zone-melting apparatus has further become known heretofore from German Published Non-Prosecuted Application (DE-OD) No. 27 39 060 which has a heating parallel resonance circuit fed by a high-frequency generator, the inductive component of the parallel resonance circuit being formed by a melting coil and a coil serially connected therewith and having a high inductance compared to that of the rod-heating coil and wherein the rod-heating coil is connected in parallel with a variable capacitor, through which the thus formed component resonance circuit is adjustable to a harmonic wave of the base frequency of the high frequency generator. In this manner, it has been made possible that frequency variations in this component-resonance circuit, which are produced by volume-variations of the melting zone of the melted rod, serve as output values for producing the nominal value for regulation or control of the rod diameter. Also, with this heretofore known apparatus, the danger arises of the occurrence of flash-overs because the heating resonance circuit oscillates on an harmonic of the base frequency of the high-frequency generator.

It is accordingly an object of the invention to provide a method and apparatus for producing silicon by crucible-free zone melting which avoids the foregoing disadvantages of the heretofore known methods and apparatus of this general type and in which, more specifically, the high-frequency source delivers a substantial sinusoidal signal, has a good efficiency and is uncritical with respect to the load.

With the foregoing and other in view, there is provided, in accordance with the invention, a method of producing silicon by crucible-free zone melting a substantially vertically held silicon rod with which a melting zone, produced by an induction heating coil which, together with an oscillating circuit coil, connected in series therewith and determining the oscillating-circuit frequency and having a high inductance in comparison with that of the induction heating coil heating up the rod material, forms the inductive component of a heating parallel oscillating circuit fed by a high-frequency generator and has a heating-circuit capacitor connected in parallel with the heating coil, is passed through the silicon rod in direction of the rod axis, which comprises dimensioning the component resonance circuit formed by the induction heating coil and the heating-circuit capacitor to a frequency deviating by less than a factor of 2 from the frequency of the high-frequency generator.

In accordance with another mode of the method of the invention, the frequency to which the component resonance circuit is dimensioned is such that the condition $$1.0 < f_s/f_p < 1.5,$$

wherein $f_p$ is the frequency of the high-frequency generator and $f_s$ is the frequency of the component-resonance circuit, is met.

In accordance with an alternative mode of the method of the invention, the frequency to which the component resonance circuit is dimensioned is such that the condition $$1.0 < f_p/f_s < 1.5,$$

wherein $f_p$ is the frequency of the high frequency generator and $f_s$ is the frequency of the component-resonance circuit, is met.

In accordance with a further mode of the method of the invention, the frequency of the high-frequency generator is within the range of 1 to 5 MHz.

In accordance with an added mode of the method of the invention, for a given operating frequency, the operating voltage applied to the induction heating coil is such that it lies in the mean voltage range of a frequency-dependent voltage divider formed by the oscillating-circuit coil and the component-resonance circuit.

In accordance with a concomitant mode of the method of the invention, the method comprises dimensioning the heating parallel oscillating circuit, for a frequency-dependent feedback of the high-frequency generator, so that a so-called second pole frequency of the heating parallel oscillating circuit has no feedback considerations.

In accordance with the apparatus according to the invention for performing the method, the apparatus comprises an induction heating coil disposable in a zone-melting apparatus for surrounding a silicon rod, the induction heating coil, together with an oscillating-circuit coil serially connected therewith and having a high inductance when compared to that of the induction heating coil, forming an inductive component of a heating parallel circuit fed by a high-frequency generator and having a heating-circuit capacitor connected in parallel with the heating coil which is of such capacitance that the frequency of the component resonant circuit formed by the induction heating coil and the heating-circuit capacitor deviates by less than a factor of 2 from the frequency of the high-frequency generator.

Other features which are considered as characteristic for the invention are set forth in the appended claims.

Although the invention is illustrated and described herein as embodied in method and apparatus for the manufacture of silicon by crucible-free zone melting, it is nevertheless not intended to be limited to the details shown, since various modifications and structural changes may be made therein without departing from the spirit of the invention and within the scope and range of equivalents of the claims.

Figure 2:
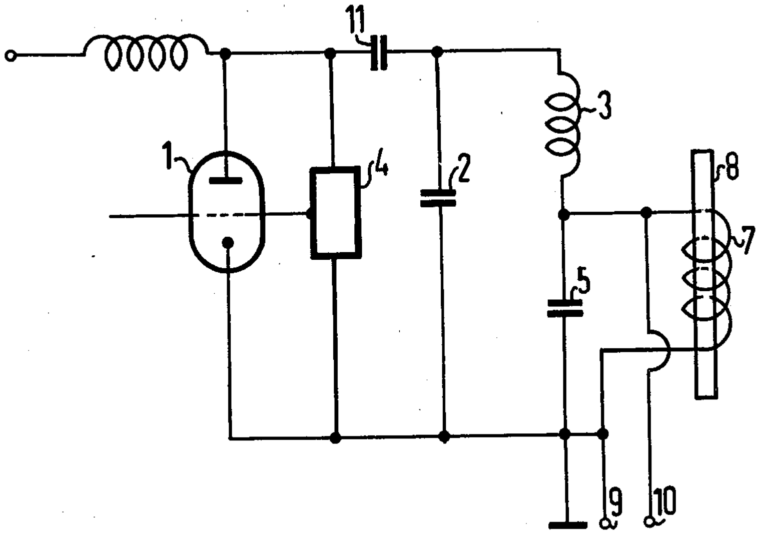

The construction and method of operation of the invention, however, together with additional objects and advantages thereof will be best understood from the following description of specific embodiments when read in connection with the accompanying drawings, in which:

FIG. 1 is a circuit diagram of a conventional high-frequency generator known in the prior art; and FIG. 2 is a circuit diagram of an embodiment of a high-frequency generator as used in apparatus for performing the method according to the invention.

Referring now to the drawing and first, particularly, to FIG. 1 thereof, there is shown a generator circuit such as has been described heretofore, for example, in German Published Non-Prosecuted Application (DE-OS) No. 27 39 060. The output of a high-frequency generator 1 is connected through a coupling capacitor 11 to a parallel oscillating circuit formed of a capacitor 2 and serially connected coils 3 and 7, the coil 7 being an induction heating coil surrounding a silicon rod 8, and the coil 3 being an oscillating-circuit coil. The oscillating-circuit coil 3 has a high inductance in comparison to that of the induction heating coil 7 for reasons of adjusting to or matching the internal resistance of the oscillator tubes, because induction heating coils generally have a low inductance.

Since the high-frequency voltage of the oscillator tubes is very rich in harmonics because of the generally used C-operation, the high frequency applied to the induction heating coil 7 is not substantially sinusoidal but is, rather, rich in harmonics. As mentioned in the introduction hereto, the danger of flash-over in vicinity of the induction heating coil 7 accordingly increases, which can result in damage to the zone-melting apparatus and to destruction of a growing monocrystal.

The disadvantages of heretofore known apparatus and methods for crucible-free zone melting semiconductor material are avoided by employing a high-frequency generator according to the invention, an embodiment of which is shown by way of example in the circuit diagram of FIG. 2. The embodiment of the invention shown in FIG. 2 differs from the conventional apparatus shown in FIG. 1 primarily by a heating-circuit capacitor 5 of relatively high capacitance, which is connected in parallel with the induction heating coil 7 and forms therewith a component resonance circuit. This capacitor 5 is provided with such dimensions as to tune the component resonance circuit to a frequency which deviates by less than a factor of 2 from the frequency of the high-frequency generator.

A capacitor connected in parallel, in a similar manner, is described in fact, in German Published Non- Prosecuted Application (DE-OS) No. 27 39 060; this heretofore known capacitor is of such dimensions, however, that the component resonance circuit formed therefrom with the induction heating coil is tuned to a higher harmonic of the signal delivered by the high-frequency generator and serves for forming an output value for controlling or regulating the rod diameter.

It has been found that, by connecting in parallel a suitably dimensioned capacitor 5 to the induction heating coil 7, a considerably greater current flows therein than in the circuit of the capacitor 2 and the oscillating-circuit coil 3, due to reactive power compensation and, accordingly, the efficiency over heretofore known circuits is considerably improved. A result simultaneously attained is that a largely sinusoidal high-frequency current flows through the coil 7, which is of considerable significance for avoiding flash-overs. Both the efficiency as well as harmonic freedom of the device is noncritical with respect to load variations.

Power regulation can be effected through the anode voltage, for example, by means of a thyristor positioner. Such regulation is rapid and avoids damaging temperature deviations in the growing monocrystal. A stretch-and-compress regulation with the nominal or actual voltage of the induction heating coil 7 taken off the terminals 9 and 10 as input parameter, furthermore, exhibits good sensivity.

By suitable dimensioning of the capacitor 5, either the advantages of the inductive flank of the component resonance circuit, such as thermal stabilization of the melt material, for example, or the advantages of the capacitive flank of the component resonance circuit, such as mechanical stabilization of the melt material, for example, is attained.

The capacitor 5 is preferably dimensioned so that, for an operating point selected on the capacitive flank, the condition $$1.0 < f_p/f_s < 1.5$$

and, for an operating point selected on the inductive flank, the condition $$1.0 < f_s/f_p < 1.5$$

is fulfilled, wherein $f_p$ is the frequency of the high-frequency generator and $f_s$ is the frequency of the component resonance circuit.

A further optimization of the apparatus is attainable by selecting the operating voltage applied to the induction heating coil 7, at a given operating frequency so that the operating voltage is in the mean voltage range of the frequency-dependent voltage divider formed by the oscillating circuit coil 3 and the component resonance circuit 5, 7.

If a conventional frequency-dependent positive feedback or regenerator coupling 4, not otherwise described in detail herein, is used, it is recommended that the components 2, 3, 5 and 7 be so dimensioned that the second pole frequency of the oscillating circuit have no feedback condition.

Grounding of the induction heating coil 7 is noncritical and may be effected according to FIG. 1, for example, in the middle of the coil 7, or in accordance with FIG. 2, at a current lead to the coil 7.

EXAMPLE

The example relates to a high-frequency generator according to the invention as shown in FIG. 2 and exhibits, for constant values of the components 2, 3 and 7 and of the anode voltage of the generator, the voltage values $U_s$ applied to the induction heating coil 7 and measured under load, those voltage values $U_s$ being a qualitative measure for the efficiency of the high-frequency generator, for varying dimensioning of the capacitor 5. Furthermore, the frequencies $f_p$ of the high-frequency generator and $f_s$ of the component oscillating circuit formed by the coil 7 and the capacitor 5 are given at no-load for this dimensioning.

For an anode voltage of 400 V, an induction heating coil 7 with 0.14 $\mu$H, an oscillating circuit coil 3 of 1.4 $\mu$H and a capacitor 2 of 1300 pF gave the following values:

| Capacitance of the heating-circuit capacitor 5 (pF) | $U_s$ (arbitrary units) | $f_p$ (MHz) | $f_s$ (MHz) |
|---|---|---|---|
| 0 | 6.5 | 3.42 | — |
| 12,000 | 12.2 | 3.22 | 4.40 |
| 20,000 | 17.2 | 3.82 | 2.85 |
| 25,000 | 13.2 | 3.75 | 2.65 |

The voltage $U_s$ and, accordingly, the efficiency thus indicated a maximum for a given capacitance of the heating-circuit capacitor 5. The ratio $f_p$:$f_s$ was then 1.34 for the foregoing example.

There are claimed:

1. Method of producing silicon by crucible-free zone melting a substantially vertically held silicon rod with which a melting zone, produced by an induction heating coil which, together with an oscillating-circuit coil connected in series therewith and determining the oscillating-circuit frequency and having a high inductance in comparison with that of the induction heating coil heating up the rod material, forms the inductive component of a heating parallel oscillating circuit fed by a high-frequency generator and has a heating circuit capacitor connected in parallel with the heating coil, is passed through the silicon rod in direction of the rod axis, which comprises dimensioning the component resonance circuit formed by the induction heating coil and the heating-circuit capacitor to a frequency deviating by less than a factor of 2 from the frequency of the high-frequency generator.

2. Method according to claim 1 wherein the frequency to which the component resonance circuit is dimensioned is such that the condition $$1.0 < f_s/f_p < 1.5,$$

wherein $f_p$ is the frequency of the high-frequency generator and $f_s$ is the frequency of the component-resonance circuit, is met.

3. Method according to claim 1 wherein the frequency to which the component resonance circuit is dimensioned is such that the condition $$1.0 < f_p/f_s < 1.5,$$

wherein $f_p$ is the frequency of the high frequency generator and $f_s$ is the frequency of the component-resonance circuit, is met.

4. Method according to claim 1 wherein the frequency of the high-frequency generator is within the range of 1 to 5 MHz.

5. Method according to claim 1 wherein, for a given operating frequency, the operating voltage applied to the induction heating coil is such that it lies in the mean voltage range of a frequency dependent voltage divider formed by the oscillating-circuit coil and the component-resonance circuit.

6. Method according to claim 1 which comprises dimensioning the heating parallel oscillating circuit, for a frequency-dependent feedback of the high-frequency generator, so that a so-called second pole frequency of the heating parallel oscillating circuit has no feedback considerations.

7. Apparatus for performing a method of producing silicon by crucible-free zone melting comprising an induction heating coil disposable in a zone-melting apparatus for surrounding a silicon rod, said induction heating coil, together with an oscillating-circuit coil serially connected therewith and having a high inductance when compared to that of the induction heating coil, forming an inductive component of a heating parallel circuit fed by a high-frequency generator and having a heating-circuit capacitor connected in parallel with the heating coil which is of such capacitance that the frequency of the component resonant circuit formed by the induction heating coil and the heating-circuit capacitor deviates by less than a factor of 2 from the frequency of the high-frequency generator.

* * * * *